US008737327B2

(12) United States Patent
Frederiksen et al.

(10) Patent No.: US 8,737,327 B2
(45) Date of Patent: May 27, 2014

(54) CARRIER SELECTION FOR ACCESSING A CELLULAR SYSTEM

(75) Inventors: Frank Frederiksen, Klarup (DK); Klaus Ingemann Pedersen, Aalborg (DK); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 264 days.

(21) Appl. No.: 13/126,873

(22) PCT Filed: Oct. 31, 2008

(86) PCT No.: PCT/EP2008/064837
§ 371 (c)(1),
(2), (4) Date: May 18, 2011

(87) PCT Pub. No.: WO2010/049006
PCT Pub. Date: May 6, 2010

(65) Prior Publication Data
US 2011/0216731 A1  Sep. 8, 2011

(51) Int. Cl.
*H04W 72/04* (2009.01)
*H04W 4/00* (2009.01)

(52) U.S. Cl.
USPC .......................................... 370/329; 370/328

(58) Field of Classification Search
USPC ........................... 370/254–340; 709/201–213
See application file for complete search history.

(56) References Cited

U.S. PATENT DOCUMENTS

2009/0175292 A1* 7/2009 Noh et al. ..................... 370/462
2010/0130218 A1* 5/2010 Zhang et al. .................. 455/450
2010/0296467 A1* 11/2010 Pelletier et al. ............... 370/329

FOREIGN PATENT DOCUMENTS

| EP | 0 760 564 A2 | 3/1997 |
| EP | 0760564 A2 * | 5/1997 |
| EP | WO0065798 * | 11/2000 |
| EP | 1705947 A1 * | 9/2006 |
| EP | 1 705 947 A1 | 9/2008 |
| WO | WO 99/21328 | 4/1999 |
| WO | WO 00/51392 | 8/2000 |
| WO | WO 00/65798 | 11/2000 |
| WO | WO 0065798 A1 * | 11/2000 |

* cited by examiner

*Primary Examiner* — Ayaz Sheikh
*Assistant Examiner* — Debebe Asefa
(74) *Attorney, Agent, or Firm* — Harrington & Smith

(57) ABSTRACT

Embodiments provide methods, apparatuses, and software for transmitting or receiving information on at least one coverage carrier and/or at least one capacity carrier of a multi-carrier cell.

22 Claims, 4 Drawing Sheets

Cell with a single coverage carrier f1

Cell with several coverage carriers f5, f6, f7 providing additional broadcast information

US 8,737,327 B2

CARRIER SELECTION FOR ACCESSING A CELLULAR SYSTEM

FIELD OF TECHNOLOGY AND BACKGROUND

The invention generally relates to network elements, methods, apparatuses, systems and programs e.g. of or for communication. At least some of the embodiments of the invention generally relate to at least one of networks, apparatuses, methods, programs, or systems such as for example cellular systems or networks like third generation partnership project, 3GPP, long term evolution, LTE, or LTE-advanced, LTE-A, according to e.g. release 10, Rel'10, and beyond.

System implementations like LTE-A implementations may provide flexible spectrum use, FSU, with system bandwidth extended beyond the maximum bandwidth of current or upcoming systems like LTE release 8 and release 9 system which may use frequencies of e.g. up to 20 MHz. Mechanisms for extending the bandwidth beyond 20 MHz may be provided such as contiguous multi-chunk channel bonding and non-contiguous multi-carrier channel aggregation. In the present document, all these and other mechanisms are commonly referred to as FSU-driven multi-carrier cell deployment.

Backward compatibility of LTE-A to earlier systems like release 8, 9 systems allows a user equipment, e.g. according to release 8 or 9, to access a corresponding LTE-A system. Likewise, a user equipment according to an LTE-A implementation may be able to access a corresponding release 8 or 9 system. Provided that a user equipment according to release 8 or 9 is capable of operating in a scalable system bandwidth of up to 20 MHz, and that for LTE-A the system bandwidth can be extended up to 100 MHz, LTE-A radio may represent a FSU driven scalable multi-carrier system having at least one carrier compatible to, and usable with, release 8 or 9 systems or user equipments. For instance, a LTE-A multi-carrier cell may be dynamically configured in accordance with one or of the following or other assumptions and rules.

One or more carriers of a multi-carrier cell such as e.g. a LTE-A multi-carrier cell may be characterized as coverage and capacity carriers. Coverage and capacity are logical or technical quantities determining a cell regardless of technologies used.

SUMMARY

In accordance with one or more embodiments, an enhanced carrier selection, or selection option, is provided with one or more optional parallel random access channels, RACH, for accessing a cellular system e.g. LTE-A multi-carrier cellular system.

In accordance with one or more embodiments of the invention, an apparatus is provided which is configured to, or comprises respective means adapted to,
access a multi-carrier cell,
receive system information or broadcast system information, and
select at least one carrier based on the received information.

In such an apparatus, the system information may include one or more, in any arbitrary combination, of:
control information, or cell-specific implicit and/or explicit control information, for supporting carrier selection upon accessing the cell,
the control information comprising one or more, in any arbitrary combination, of:
received carrier signal strength, or received carrier interference ratio, offset between at least one selected coverage carrier and at least one capacity carrier,
offset of at least one carrier-specific downlink synchronization or pilot channel,
multi-random access channel information indicating that a user is able or allowed to attempt accessing the cell on more than one suitable carrier in parallel.

The apparatus may additionally or alternatively e.g. be configured to one or more, in any arbitrary combination, of:
receive information about at least one capacity carrier
receive the information from corresponding information or at least one system information block received on a selected coverage carrier,
the information including or comprising at least one of
implicit and/or explicit control information elements,
rules for searching, receiving, and/or initially accessing a capacity carrier,
at least one reference sequence on at least one synchronization or pilot channel of one or more capacity carriers;
preconditions specified such as offset on received carrier signal strength between a selected coverage carrier and one or more capacity carriers.

In accordance with one or more embodiments, the apparatus may e.g. be configured to one or more, in any arbitrary combination, of:
decide on continuing to detect and receive further information or system information blocks, or try to access the cell on at least one certain capacity carrier,
if received carrier signal strength on a selected coverage carrier exceeds a minimum threshold, or a threshold specified for one or more capacity carriers, synchronize and receive carrier-specific information on the corresponding capacity carrier or carriers,
select, based at least on one or more of received carrier-specific information, random access channel related information, and/or rules such as rules driven by types or priorities of subscriber profiles, requested services, one or more carriers to attempt accessing the cell,
attempt accessing the cell on a selected coverage carrier.

In accordance with one or more embodiments, the apparatus may additionally or alternatively be configured to one or more, in any arbitrary combination, of:
respond to a first or one of the first random access channel responses received from a base station on a carrier in case of parallel random access channel attempts,
indicate in a message after receiving the response about other ongoing parallel process.

The apparatus may additionally or alternatively e.g. be configured to one or more, in any arbitrary combination, of:
attempt to access the cell on a selected coverage carrier;
access the cell on either the selected coverage carrier or a suitable capacity carrier or both in parallel,
select one or more suitable carriers,
use at least one random access channel procedure on one or more selected carriers upon accessing the cell.

The apparatus may e.g. be a user equipment such as stationary or mobile terminal, a part, module, chipset or software of a user equipment.

In accordance with one or more embodiments, an apparatus may e.g. be configured to, or comprise means adapted to
provide or broadcast at least one of a coverage carrier, a capacity carrier, and system information of a multi-carrier cell, wherein the system information includes one or more, in any arbitrary combination, of:
control information, or cell-specific implicit and/or explicit control information, for supporting carrier selection,
the control information comprising one or more, in any arbitrary combination, of:
received carrier signal strength, or received carrier interference ratio, offset between at least one coverage carrier and at least one capacity carrier,
offset of at least one carrier-specific downlink synchronization or pilot channel,
multi-random access channel information indicating that a user is able or allowed to attempt accessing the cell on more than one suitable carrier in parallel.

The apparatus may additionally or alternatively e.g. be configured to one or more, in any arbitrary combination, of:
transmit information about at least one capacity carrier,
transmit the information or at least one system information block on a coverage carrier,
the information including or comprising at least one of implicit and/or explicit control information elements,
rules for searching, receiving, and/or initially accessing a capacity carrier,
at least one reference sequence on at least one synchronization or pilot channel of one or more capacity carriers;
preconditions specified such as offset on received carrier signal strength between a selected coverage carrier and one or more capacity carriers,
transmit one or several random access channel responses to a user equipment on a carrier in case of parallel random access channel attempts,
receive information about other ongoing parallel process,
transmit information on a physical or primary broadcast channel and/or broadcast channel,
transmit one or more coverage carriers and one or more capacity carriers, the carrier or carriers comprising one, more or all of the following or other information:
global cell and network system related information, multi-carrier structure with synchronization information, schedule and format of certain system information blocks, SIBS, and/or information about physical downlink control channel instances sent on capacity carriers,
system information blocks on a capacity carrier such as carrier specific or carrier-accessing information.

The apparatus may e.g. be a base station such as a nodeB or enhanced nodeB, or a part, module, chipset or software of a base station.

In accordance with one or more embodiments, a method is provided comprising at least one of
accessing a multi-carrier cell,
receiving system information or broadcast information relating to at least one carrier, and
selecting at least one carrier based on the received information.

In accordance with one or more embodiments, the method may e.g. comprise at least one, more, in any arbitrary combination, or all of:
the system information includes one or more, in any arbitrary combination, of:
control information, or cell-specific implicit and/or explicit control information, for supporting carrier selection upon accessing the cell,
the control information comprising one or more, in any arbitrary combination, of:
received carrier signal strength, or received carrier interference ratio, offset between at least one selected coverage carrier and at least one capacity carrier,
offset of at least one carrier-specific downlink synchronization or pilot channel,
multi-random access channel information indicating that a user is able or allowed to attempt accessing the cell on more than one suitable carrier in parallel;
receive information about at least one capacity carrier,
receive the information from corresponding information or at least one system information block received on a selected coverage carrier,
the information including or comprising at least one of implicit and/or explicit control information elements,
rules for searching, receiving, and/or initially accessing a capacity carrier,
at least one reference sequence on at least one synchronization or pilot channel of one or more capacity carriers;
preconditions specified such as offset on received carrier signal strength between a selected coverage carrier and one or more capacity carriers,
decide on continuing to detect and receive further information or system information blocks, or try to access the cell on at least one certain capacity carrier,
if received carrier signal strength on a selected coverage carrier exceeds a minimum threshold, or a threshold specified for one or more capacity carriers, synchronize and receive carrier-specific information on the corresponding capacity carrier or carriers,
select, based at least on one or more of received carrier-specific information, random access channel related information, and/or rules such as rules driven by types or priorities of subscriber profiles, requested services, one or more carriers to attempt accessing the cell,
attempt accessing the cell on a selected coverage carrier,
respond to a first or one of the first random access channel responses received from a base station on a carrier in case of parallel random access channel attempts,
indicate in a message after receiving the response about other ongoing parallel process,
attempt to access the cell on a selected coverage carrier;
access the cell on either the selected coverage carrier or a suitable capacity carrier or both in parallel,
select one or more suitable carriers,
use at least one random access channel procedure on one or more selected carriers upon accessing the cell.

In accordance with one or more embodiments, a method may comprise:
providing or broadcasting at least one of a coverage carrier, a capacity carrier, and system information of a multi-carrier cell,
wherein the system information includes one or more, in any arbitrary combination, of:
control information, or cell-specific implicit and/or explicit control information, for supporting carrier selection,
the control information comprising one or more, in any arbitrary combination, of:
received carrier signal strength, or received carrier interference ratio, offset between at least one coverage carrier and at least one capacity carrier,
offset of at least one carrier-specific downlink synchronization or pilot channel, multi-random access channel information indicating that a user is able or allowed to attempt accessing the cell on more than one suitable carrier in parallel.

In accordance with one or more embodiments, a method may comprise one or more, in any arbitrary combination, of:
transmit information about at least one capacity carrier,
transmit the information or at least one system information block on a coverage carrier,
the information including or comprising at least one of implicit and/or explicit control information elements,
rules for searching, receiving, and/or initially accessing a capacity carrier,
at least one reference sequence on at least one synchronization or pilot channel of one or more capacity carriers;
preconditions specified such as offset on received carrier signal strength between a selected coverage carrier and one or more capacity carriers,
transmit one or several random access channel responses to a user equipment on a carrier in case of parallel random access channel attempts,
receive information about other ongoing parallel process,
transmit information on a physical or primary broadcast channel and/or broadcast channel,
transmit one or more coverage carriers and one or more capacity carriers, the carrier or carriers comprising one, more or all of the following or other information:
global cell and network system related information, multi-carrier structure with synchronization information, schedule and format of certain system information blocks, SIBS, and/or information about physical downlink control channel instances sent on capacity carriers,
system information blocks on a capacity carrier such as carrier specific or carrier-accessing information.

In accordance with one or more embodiments, a network may comprise at least one apparatus as defined above or below.

In accordance with one or more embodiments, a computer program product or software, optionally embodied on a computer-readable medium, may comprise code means configured to carry out or implement, when run on a processor, one or more methods as mentioned above or below.

In accordance with one or more of the embodiments described below or shown in the drawings, at least one of a system, apparatus, method, and computer program product or software is provided. The software or computer program product may comprise code means configured to carry out or implement one or more of the steps or processes described below, when run on a processor. The computer program product or software may e.g. be embodied on a computer-readable medium such as a hard disk, server, data carrier, etc.

Other objects, features and advantages of the invention will become apparent from the following description of embodiments of the invention.

DESCRIPTION OF EMBODIMENTS

In accordance with one or more embodiments, a cell comprises at least one coverage carrier. The coverage carrier may be associated with a lower centre frequency. A lower-frequency carrier may provide better radio coverage.

Cell coverage is determined by the coverage carrier or the total or mutually inclusive or overlapping coverage of all the coverage carriers of the cell.

A coverage carrier provides certain cell capacity and therefore has all properties of a capacity carrier.

A capacity carrier as such may e.g. be considered as one or more cell extensions or supports such as for instance an access-and/or-capacity extension of the cell, e.g. an advanced FSU-driven access-and-capacity extension of the cell.

Figure 1:
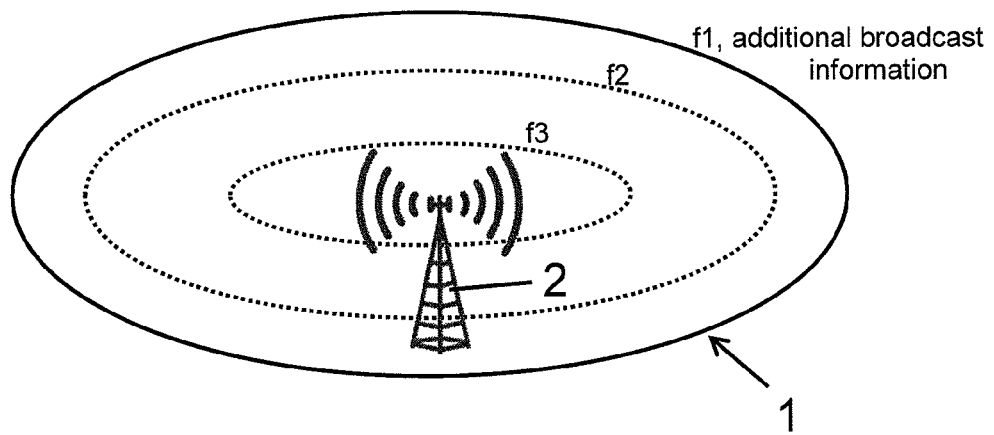
FIG. 1 illustrates a system and apparatuses in accordance with an embodiment of the invention.
Figure 2:
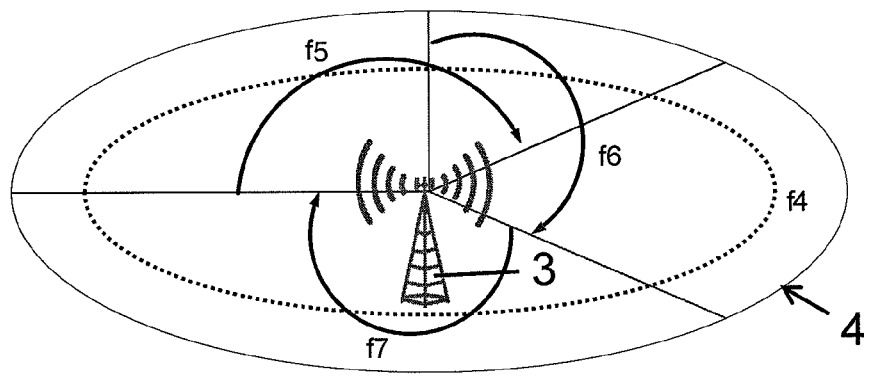
FIG. 2 shows an embodiment configured in accordance with another implementation of the invention.

FIGS. 1, 2 illustrate a dynamic cell configuration e.g. for a multi-carrier implementation such as a FSU-driven multi-carrier cell deployment.

FIG. 1 shows an embodiment of a system and apparatuses in accordance with an implementation of the invention. FIG. 1 shows an implementation wherein a cell 1 comprises one or more base stations 2 such as NodeBs, enhanced NodeBs, eNB, base transceiver stations, or other types of access systems or radio access devices. The base station 2 transmits or broadcasts, or is configured to transmit or broadcast, at least one coverage carrier f1. The coverage carrier f1 optionally transmits or broadcasts additional information, as described below in more detail. The embodiment of FIG. 1 shows a cell with a single coverage carrier f1. In the example embodiment of FIG. 1, cell coverage is provided by the one coverage carrier f1 marked with solid line.

In the embodiment of FIG. 1, at least one or more capacity carriers f2, f3 are provided which are marked with dotted circles. In the embodiments shown, two capacity carriers f2, f3 are employed. The capacity carriers f2, f3 may be broadcast or transmitted by the base station 2 or by one or more other base stations not shown. In the embodiment of FIG. 1, the cell 1 provides or broadcasts the coverage carrier f1 so as to provide and carry additional broadcast information, as described below.

In the embodiment of FIG. 1, the frequencies may for instance have example values as follows f1=900 MHz, f2=2 GHz and f3=3 GHz.

The embodiment of FIG. 2 illustrates a cell 4 with several coverage carriers f1, f2, f3. In the example embodiment of FIG. 2, cell coverage is provided by the three coverage carriers f1, f2, f3 marked with arc-arrows. There is also provided another carrier such as a capacity carrier f4 marked with dotted circle. In the embodiment of FIG. 2, the cell 4 provides or broadcasts several coverage carriers f1, f2, f3 so as to provide additional broadcast information.

In the embodiment of FIG. 2, the cell 4 comprises one or more base stations 3 such as NodeBs, enhanced NodeBs, eNB, base transceiver stations, or other types of access systems or radio access devices. The base station 3 transmits or broadcasts at least two or more coverage carriers f5, f6, f7. In the embodiment of FIG. 2, three coverage carriers are provided. At least one or all of the coverage carriers f5, f6, f7 optionally transmit or broadcast additional information, as described below in more detail.

In the embodiment of FIG. 2, at least one (or more) capacity carrier f4 is provided which is marked with a dotted circle. In the embodiment shown, two or more capacity carriers may also be employed. The capacity carrier f4 may be broadcast or transmitted by the base station 3 or by one or more other base stations not shown. In the embodiment of FIG. 2, the cell 4 provides or broadcasts the coverage carriers f5, f6, f7 so as to provide and carry additional broadcast information, as described below.

Cell coverage is determined by the total or mutually inclusive or overlapping coverage of all the coverage carriers of the cell, as illustrated by the examples in FIGS. 1, 2.

Capacity carriers may be added and removed without notable impacts on the users in the cell, e.g., not resulting in any handovers or location updates.

In case backward compatibility is provided or desired, one, more or all coverage carriers of the cell may be backward compatible.

Regular cell selection and reselection may be based upon users' reception of coverage carriers.

In accordance with one or more embodiments, actual access to a cell by one or more of the users or user equipments for services may be enhanced with advanced carrier selection. The access may e.g. use one or more random access channel, RACH, procedures in uplink, e.g. for initial access.

In this regard, a capacity carrier as such may e.g. not be visible or relevant to users in cell selection and reselection.

Information e.g. regarding or relating to physical or primary broadcast channel, PBCH, and/or broadcast channel, BCH, may be sent or received on one or more coverage carriers f1, f2, f5, f6, f7, and may include one, more or all of the following or other information including global cell and network system related information, multi-carrier structure with synchronization information, schedule and format of certain system information blocks, SIBs, and/or information about physical downlink control channel, PDCCH, instances sent on relevant capacity carriers.

System information blocks SIBs sent on a capacity carrier, as such, may e.g. be mainly carrier specific, e.g., carrier-accessing information.

In accordance with one, more or all embodiments, a simple and effective method, apparatus, software, system etc. are provided for enhancing the carrier selection of users in accessing a cell such as a multi-carrier cell like a LTE-A multi-carrier cell 1, 4 as mentioned above.

Figure 4:
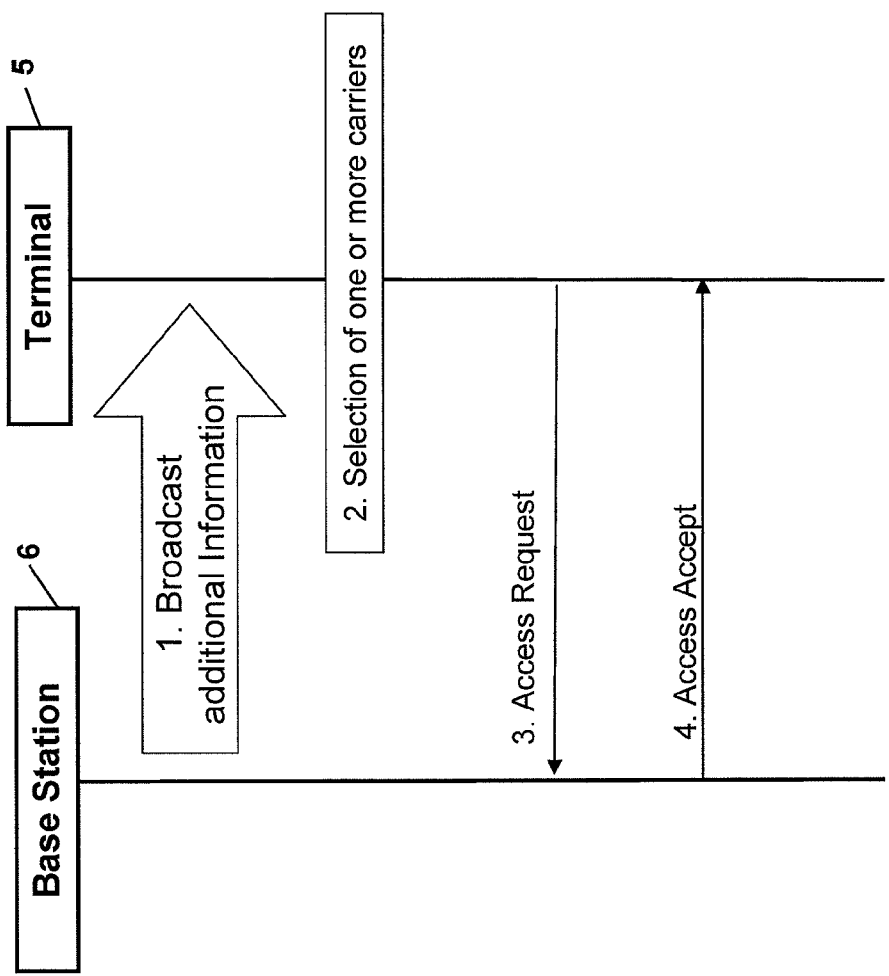
FIG. 4 shows a method and functionalities in accordance with a further embodiment of the invention.

FIG. 4 illustrates an embodiment of a system, method and embodiments of apparatuses in accordance with the invention. FIG. 4 shows an implementation which involves at least one of the shown components such as at least one user equipment such as a terminal 5 and one or more base stations 6 such as e.g. nodeB, eNB, etc.

As shown in the embodiment of FIG. 4, at least one or more of the base stations 6 are configured to send or broadcast a broadcast signal e.g. on the broadcast channel BCH or PBCH which signal includes additional information as described above and below. In case the terminal 5 receives the transmitted or broadcast signal and desires to attach, register or initiate a connection or service etc, the terminal 1 performs a step, function or process 2, using or selecting one or more of the carriers (coverage and/or capacity carriers) provided by the cells 1, 4 of FIGS. 1, 2, or by the base station 6 of FIG. 4. The user equipment or terminal 5 then may send a request such as an attach, register, access or other type of request, or other information to the base station 6, as shown by step or process 3. The base station 6 may respond with a confirmation or accept message 4 e.g. when providing, or being able to provide, the requested access, service etc.

Figure 5:
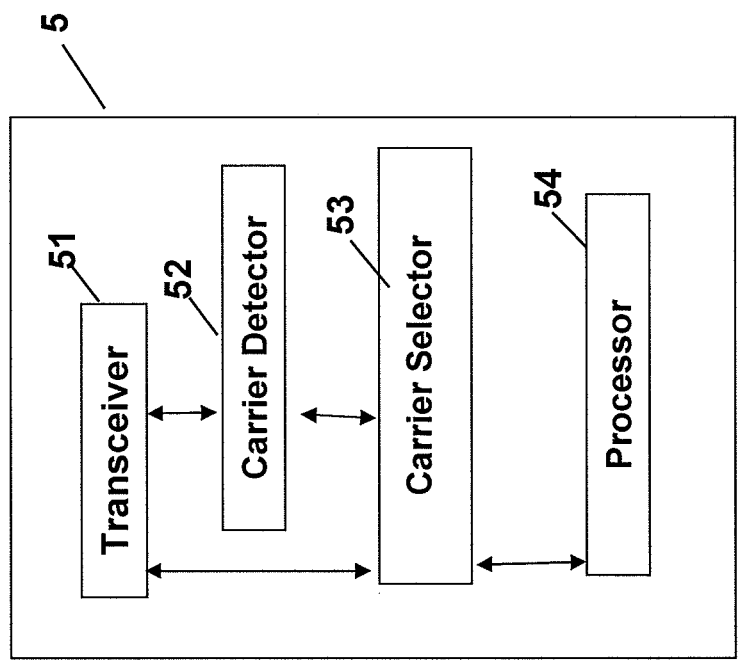
FIG. 5 illustrates an apparatus such as a terminal or part of a terminal in accordance with another embodiment of the invention.

FIG. 5 illustrates an embodiment of a user equipment or terminal 5, or part thereof like a module, chipset, software, etc, in accordance with an implementation of the invention.

The terminal 5 comprises a transceiver 51 for transmitting and receiving signals to and from e.g. a base station 2, 3, 6, a carrier detector 52 for detecting one or more parallel usable carriers such as coverage and/or capacity carriers, a carrier selector 53 for selecting one or more of the detected or indicated carriers e.g. in the manner as described above or below, and a processor 54 for signal processing and/or controlling one or more of the components of FIG. 5 or of the terminal 5.

Figure 6:
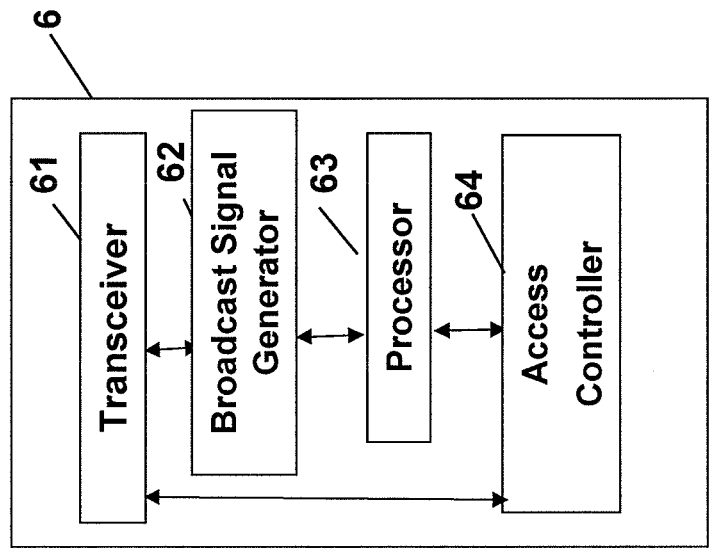
FIG. 6 shows an apparatus such as a base station or part of a base station in accordance with another embodiment of the invention.

FIG. 6 shows an embodiment of a base station 1, 3, 6, or part thereof like a module, chipset, software, etc, such as an evolved NodeB etc. in accordance with an optional implementation of the invention. The base station 6 comprises a transceiver 61 for transmitting and receiving signals to and from e.g. the terminal 5, a broadcast signal generator 62 for generating a broadcast signal e.g. as described above or below, including the additional information, an access controller 64 for controlling the access of the terminal 5 to the network, and a processor 63 for signal processing and/or controlling one or more of the components of FIG. 6 or of the base station 1, 3, 6.

In accordance with one or more embodiments of the invention, enhancements to random access are provided enabling one or more user equipments, UE, to select which carrier or carriers to use for random access. In accordance with one or more embodiments, an access such as the random access may e.g. be effected using two or more or multiple carriers in parallel.

One or more embodiments may provide one or more of the following merits: the chance of successful initial access right at the first access attempt, e.g. a RACH attempt, is enhanced. A better performance of the initial access procedure and/or good load-balancing among the carriers of the cell may be provided. An initial access delay may be reduced e.g. in cases where e.g. the number of mobile users in the cell is high and/or only limited RACH preambles are available.

The possibility of accessing the cell in different carriers or extending RACH capacity of the cell in accordance with one or more embodiments thus is able to provide benefits.

In line with a dynamic configuration of a multi-carrier cell, e.g. a LTE-A multi-carrier cell 1, 4, one or more of the following features may be provided alone or in any arbitrary combination.

New or additional broadcast system information items are introduced which include one or more, in any arbitrary combination, of cell-specific implicit/explicit control information for supporting carrier selection of advanced users upon accessing the cell. These control information include for example one or more, in any arbitrary combination, of: RCSS, received carrier signal strength (e.g. received carrier interference ratio, CIR), e.g. of carrier-specific downlink DL synchronization or pilot channels, offsets between selected coverage carrier and relevant or provided capacity carriers, multi-RACH information (e.g., in supporting that the user may be able and allowed to attempt accessing the cell on more than one suitable carrier in parallel), and so forth.

In case of a user having parallel RACH attempts, the user will respond to the earliest RACH response received from the base station or nodeB, NB, on the corresponding carrier. In accordance with one or more embodiment, upon sending the next message, e.g., an actual connection establishment and service request after receiving initial RACH response from the base station or NB, the user will also indicate about the other ongoing parallel RACH process to the NB so that the NB can stop handling that as soon as possible and free resources for other users.

The aforementioned indication about the other ongoing parallel RACH process may be omitted when the NB is already aware of ongoing parallel RACH processes of the given user. For examples, the NB may have prior knowledge about a particular user attempting access using RACH in the following cases: during handover, HO, the target base station or NB may allocate dedicated resources such as preamble(s) to the user for initiating RACH procedure(s) in uplink (in different carriers in case of parallel RACH); or in location-aware paging in which the NB pages a particular user residing in its cell coverage for an immediate service and also assigns the user with dedicated resources for initiating RACH procedure(s) as in the previous case; or similarly when a particular user wakes up from a long DRX (Discontinuous Reception and Transmission) sleep and needs to resynchronize to the NB in uplink.

In accordance with one or more embodiments, the carrier selection procedure is able to provide backward compatibility e.g. to LTE release 8-9 and LTE-A UEs, and may for example work as follows:

User equipments such as e.g. both release Rel'8-9 and LTE-A UEs are optionally configured to select (and reselect) a multi-carrier cell, e.g. a LTE-A FSU-driven multi-carrier cell based on detected and received coverage carrier(s) of the cell similarly to regular Rel'8-9 cell selection and reselection procedures. A user equipment such as Rel'8-9 UE camps in the cell and may attempt to access the cell (using RACH procedure) on the selected coverage carrier; whereas a user equipment such as LTE-A UE camps on the selected coverage carrier and may attempt to access the cell on either the selected coverage carrier or a suitable capacity carrier or both in parallel. Thus, selecting one or more suitable carriers and using RACH procedure(s) on selected carriers upon accessing the cell is a new feature proposed herein for LTE-A UE in particular.

This feature is also applicable to other types of user equipments and cells.

A user equipment such as an LTE-A UE may get information about relevant capacity carrier(s) from corresponding information such as system information block(s), SIB(s), received on a selected carrier such as a coverage carrier, the information optionally including or comprising implicit and/or explicit control information elements and rules for searching, receiving, and/or initially accessing a capacity carrier. These items may include reference sequence(s) which are sent on synchronization or pilot channel(s) of relevant capacity carrier(s); preconditions specified by e.g. certain offset(s) on received carrier signal strength, RCSS, between the selected coverage carrier and one or more relevant or accessible capacity carrier(s) for LTE-A UE to decide whether it should go on to detect and receive further SIB(s) and eventually try to access the cell on certain capacity carrier(s) or not. More particularly, if received received carrier signal strength, RCSS, on the selected coverage carrier exceeds a minimum threshold, specified for coverage-carrier selection, e.g. plus certain offset(s), specified for each of relevant individual capacity carrier(s), then LTE-A UE will try to synchronize and receive carrier-specific SIB(s) sent on the corresponding capacity carrier(s).

Then, based on the received carrier-specific information (including RACH related information) and/or other rules driven by e.g. types or priorities of subscriber profiles, requested services, and so forth, the user equipment such as LTE-A UE may select suitable carrier(s) to attempt accessing the cell. Otherwise, the user equipment such as LTE-A UE may attempt accessing the cell on the selected coverage carrier as if it were a Rel'8-9 UE.

In accordance with one, more or all embodiments, one or more apparatuses, methods, system etc are provided which may be implemented in a simple and effective manner, allowing for one or more or all of good or even optimal design of system, apparatus and/or network features such as LTE-A features, flexible cell deployment, and fulfilling backward compatibility demands. In particular, embodiments may provide one more or all of advantages like enhancing the performance of the initial access procedure and/or load-balancing aspect among the carriers of the cell, reducing initial access delay and enhancing resource utility of individual carriers.

Figure 3:
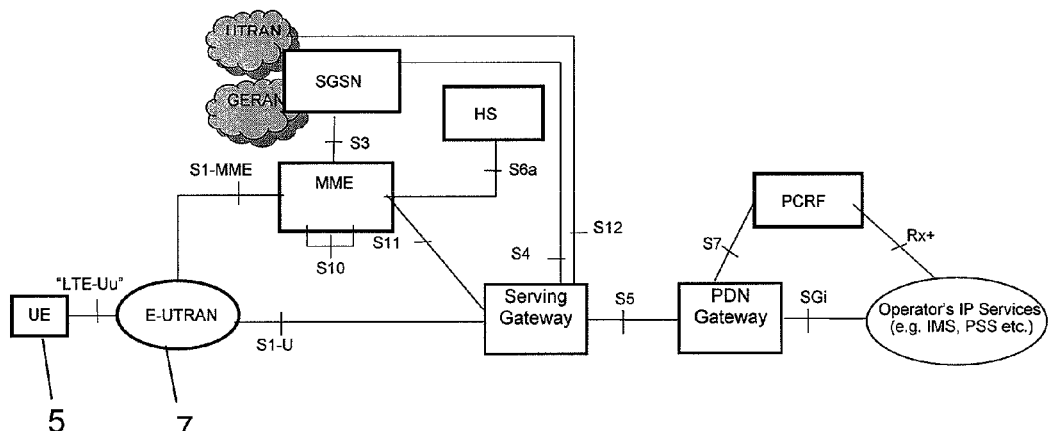
FIG. 3 illustrates another embodiment in accordance with the invention.

In accordance with one or more embodiments, a network architecture such as an evolved packet system, EPS, architecture shown in FIG. 3 may comprise a radio access network 7 such as an evolved universal terrestrial radio access network, E-UTRAN, UTRA or UTRAN Long Term Evolution access. A user equipment 5 such as a mobile or stationary terminal may access the radio access network 7 or a base station 2, 3, 6 of FIGS. 1, 2, 6 of such a radio acces network 7, in case a connection to or from another party, server etc or any other type of service is desired or provided. The network architecture shown in FIG. 3 may further comprise one or more of the following: a serving general packet radio service, GPRS, support node, SGSN, a mobility management entity, MME, for managing mobility, UE identities and security parameters, a UMTS terrestrial radio access network, UTRAN, a GERAN, GSM/EDGE, Enhanced Data rate for GSM Evolution, a HS, a serving gateway e.g. for terminating an interface towards E-UTRAN, a PDN gateway being a node that terminates an SGi interface towards a packet data network, PDN, a PCRF, and operator's IP services (e.g. IMS, PSS etc.). A PDN gateway (P-GW or PGW) may basically, according to an embodiment, be a gateway general packet radio service, GPRS, support node, GGSN.

A network may comprise such an apparatus as mentioned above or in the following. The network may comprise an evolved packet service, EPS architecture, or may comprise at least one of a serving general packet radio service support node, SGSN, a mobility management entity, MME, or a gateway are provided.

For the purpose of the present invention as described herein above, it should be noted that any access or network technology may be used which may be any technology by means of which a user equipment can access a network. The network may be any device, unit or means by which a mobile or stationary entity or other user equipment may connect to and/or utilize services offered by the network. Such services may include, among others, data and/or (audio-) visual communication, data download etc.

Generally, the present invention is also applicable in those network/terminal environments relying on a data packet based transmission scheme according to which data are transmitted in data packets and which are for example based on the Internet Protocol IP. The present invention is, however, not limited thereto, and any other present or future IP or mobile IP version, or, more generally, a protocol following similar principles is also applicable. The user equipment entity may be any device, unit or means by which a system user may experience services from a network.

The sequence of method steps described above or shown in the drawings can be implemented in any other sequence arbitrarily deviating from the above described or shown sequence of steps. Further, the method, apparatuses and devices, may include only one, more or all of the features described above or shown in the drawings, in any arbitrary combination. The method steps may be implemented as software code portions and be run using a processor at a network element or terminal, can be software code independent, or can be specified using any known or future developed programming language as long as the functionality defined by the method steps is preserved. Generally, any method step is suitable to be implemented as software or by hardware without changing the idea of the present invention in terms of the functionality implemented. Devices, apparatus, units, or means, and/or method steps may be implemented as hardware components of a stationary or mobile station, or a terminal, or a network element, or part, or chipset, or module thereof, which part, or chipset, or module e.g. be used for an apparatus; may be hardware independent; and may be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. Devices, apparatus, units or means (e.g. User equipment, CSCF) can be implemented as individual devices, units, means, chipsets, modules, or part of devices, and may also be implemented in a distributed fashion throughout a system, as long as the functionality of the device, unit or means is preserved.

The above description of embodiments is not considered to limit the scope of the invention or claims in any manner.

The invention claimed is:

1. An apparatus configured to comprising:
one or more processors; and
one or more memories including computer program code, the one or more memories and the computer program code configured, with the one or more processors, to cause the apparatus to perform at least the following:
receiving system information or broadcast system information, wherein the system information includes multi-random access channel information indicating that the apparatus is able or allowed to attempt accessing a multi-carrier cell on more than one carrier in parallel;
selecting at least one carrier based on the received information; and
accessing the multi-carrier cell, wherein access is on a coverage carrier and a capacity carrier in parallel.

2. The apparatus according to claim 1, wherein the system information includes one or more, in any arbitrary combination, of:
control information, or cell-specific implicit and/or explicit control information, for supporting carrier selection upon accessing the cell,
the control information comprising one or more, in any arbitrary combination, of:
received carrier signal strength, or received carrier interference ratio, offset between at least one selected coverage carrier and at least one capacity carrier, and
offset of at least one carrier-specific downlink synchronization or pilot channel.

3. The apparatus according to claim 1, wherein the one or more memories and the computer program code are further configured, with the one or more, processors, to cause the apparatus to perform one or more, in any arbitrary combination, of the following:
receiving information about at least one capacity carrier;
receiving the information from corresponding information or at least one system information block received on a selected coverage carrier,
the information including or comprising at least one of:
implicit and/or explicit control information elements;
rules for searching, receiving, and/or initially accessing a capacity carrier;
at least one reference sequence on at least one synchronization or pilot channel of one or more capacity carriers; and
preconditions specified such as offset on received carrier signal strength between a selected coverage carrier and one or more capacity carriers.

4. The apparatus according to claim 1, wherein the one or more memories and the computer program code are further configured, with the one or more, processors, to cause the apparatus to perform one or more, in any arbitrary combination, of the following:
deciding on continuing to detect and receive further information or system information blocks, or trying to access the cell on at least one certain capacity carrier;
when received carrier signal strength on a selected coverage carrier exceeds a minimum threshold, or a threshold specified for one or more capacity carriers, synchronizing and receiving carrier-specific information on the corresponding capacity carrier or carriers;
selecting, based at least on one or more of received carrier-specific information, random access channel related information, and/or rules such as rules driven by types or priorities of subscriber profiles, requested services, one or more carriers to attempt accessing the cell; and
attempting to access the cell on a selected coverage carrier.

5. The apparatus according to claim 1, wherein the one or more memories and the computer program code are further configured, with the one or more, processors, to cause the apparatus to perform one or more, in any arbitrary combination, of the following:
responding to a first or one of the first random access channel responses received from a base station on a carrier in case of parallel random access channel attempts, and
indicating in a message after receiving the response about other ongoing parallel process.

6. The apparatus according to claim 1, wherein the one or more memories and the computer program code are further configured, with the one or more, processors, to cause the apparatus to perform one or more, in any arbitrary combination, of the following:
attempting to access the cell on a selected coverage carrier;
accessing the cell on either the selected coverage carrier or a suitable capacity carrier;
selecting one or more suitable carriers; and
using at least one random access channel procedure on one or more selected carriers upon accessing the cell.

7. The apparatus according to claim 1, wherein the apparatus is a user equipment such as stationary or mobile terminal, a part, module, chipset or software of a user equipment.

8. An apparatus comprising:
one or more processors; and
one or more memories including computer program code, the one or more memories and the computer program code configured, with the one or more processors, to cause the apparatus to perform at least the following:
providing or broadcasting at least one of a coverage carrier, a capacity carrier, and system information of a multi-carrier cell,
wherein the system information includes multi-random access channel information indicating that a user is able or allowed to attempt accessing a multi-carrier cell on more than one carrier in parallel, and further includes one or more, in any arbitrary combination, of:

control information, or cell-specific implicit and/or explicit control information, for supporting carrier selection, the control information comprising one or more, in any arbitrary combination, of:

received carrier signal strength, or received carrier interference ratio, offset between at least one coverage carrier and at least one capacity carrier, and offset of at least one carrier-specific downlink synchronization or pilot channel.

9. The apparatus according to claim 8, wherein the one or more memories and the computer program code are further configured, with the one or more, processors, to cause the apparatus to perform one or more, in any arbitrary combination, of the following:

transmitting information about at least one capacity carrier, transmitting the information or at least one system information block on a coverage carrier, the information including or comprising at least one of:

implicit and/or explicit control information elements, rules for searching, receiving, and/or initially accessing a capacity carrier, at least one reference sequence on at least one synchronization or pilot channel of one or more capacity carriers; and preconditions specified such as offset on received carrier signal strength between a selected coverage carrier and one or more capacity carriers, transmitting one or several random access channel responses to a user equipment on a carrier in case of parallel random access channel attempts, receiving information about other ongoing parallel process, transmitting information on a physical or primary broadcast channel and/or broadcast channel, transmitting one or more coverage carriers and one or more capacity carriers, the carrier or carriers comprising one, more or all of the following or other information:

global cell and network system related information, multi-carrier structure with synchronization information, schedule and format of certain system information blocks, SIBs, and/or information about physical downlink control channel instances sent on capacity carriers, and system information blocks on a capacity carrier such as carrier specific or carrier-accessing information.

10. The apparatus according to claim 8, wherein the apparatus is a base station such as a nodeB or enhanced nodeB, or a part, module, chipset or software of a base station.

11. A method comprising:

receiving system information or broadcast information relating to at least one carrier, wherein the system information includes multi-random access channel information indicating that an apparatus is able or allowed to attempt accessing a multi-carrier cell on more than one carrier in parallel;

selecting at least one carrier based on the received information; and accessing the multi-carrier cell, wherein access is on a coverage carrier and a capacity carrier in parallel.

12. The method according to claim 11, wherein the system information includes one or more, in any arbitrary combination, of:

control information, or cell-specific implicit and/or explicit control information, for supporting carrier selection upon accessing the cell, the control information comprising one or more, in any arbitrary combination, of:

received carrier signal strength, or received carrier interference ratio, offset between at least one selected coverage carrier and at least one capacity carrier, and offset of at least one carrier-specific downlink synchronization or pilot channel, and/or further comprising one or more of:

receiving information about at least one capacity carrier, receiving the information from corresponding information or at least one system information block received on a selected coverage carrier, the information including or comprising at least one of:

implicit and/or explicit control information elements;

rules for searching, receiving, and/or initially accessing a capacity carrier;

at least one reference sequence on at least one synchronization or pilot channel of one or more capacity carriers; and preconditions specified such as offset on received carrier signal strength between a selected coverage carrier and one or more capacity carriers, deciding on continuing to detect and receive further information or system information blocks, or trying to access the cell on at least one certain capacity carrier;

when received carrier signal strength on a selected coverage carrier exceeds a minimum threshold, or a threshold specified for one or more capacity carriers, synchronizing and receiving carrier-specific information on the corresponding capacity carrier or carriers;

selecting, based at least on one or more of received carrier-specific information, random access channel related information, and/or rules such as rules driven by types or priorities of subscriber profiles, requested services, one or more carriers to attempt accessing the cell; and attempting to access the cell on a selected coverage carrier, responding to a first or one of the first random access channel responses received from a base station on a carrier in case of parallel random access channel attempts, and indicating indicate in a message after receiving the response about other ongoing parallel process, attempting to access the cell on a selected coverage carrier;

accessing the cell on either the selected coverage carrier or a suitable capacity carrier;

selecting one or more suitable carriers; and using at least one random access channel procedure on one or more selected carriers upon accessing the cell.

13. A method comprising:

providing or broadcasting at least one of a coverage carrier, a capacity carrier, and system information of a multi-carrier cell, wherein the system information includes multi-random access channel information indicating that a user is able or allowed to attempt accessing a multi-carrier cell on more than one carrier in parallel, and further includes one or more, in any arbitrary combination, of:

control information, or cell-specific implicit and/or explicit control information, for supporting carrier selection, the control information comprising one or more, in any arbitrary combination, of:

received carrier signal strength, or received carrier interference ratio, offset between at least one coverage carrier and at least one capacity carrier, and offset of at least one carrier-specific downlink synchronization or pilot channel.

14. A method according to claim 13, further comprising one or more, in any arbitrary combination, of:
- transmitting information about at least one capacity carrier,
- transmitting the information or at least one system information block on a coverage carrier,
- the information including or comprising at least one of:
- implicit and/or explicit control information elements,
- rules for searching, receiving, and/or initially accessing a capacity carrier,
- at least one reference sequence on at least one synchronization or pilot channel of one or more capacity carriers; and
- preconditions specified such as offset on received carrier signal strength between a selected coverage carrier and one or more capacity carriers,
- transmitting one or several random access channel responses to a user equipment on a carrier in case of parallel random access channel attempts,
- receiving information about other ongoing parallel process,
- transmitting information on a physical or primary broadcast channel and/or broadcast channel,
- transmitting one or more coverage carriers and one or more capacity carriers, the carrier or carriers comprising one, more or all of the following or other information:
- global cell and network system related information, multi-carrier structure with synchronization information, schedule and format of certain system information blocks, SIBs, and/or information about physical downlink control channel instances sent on capacity carriers, and
- system information blocks on a capacity carrier such as carrier specific or carrier-accessing information.

15. A network comprising at least one apparatus according to claim 1.

16. A computer program product comprising a non-transitory computer-readable storage medium bearing computer program code embodied therein for use with a computer, the computer program code comprising code for performing the method according to claim 11.

17. A network comprising at least one apparatus according to claim 8.

18. A computer program product comprising a non-transitory computer-readable storage medium bearing computer program code embodied therein for use with a computer, the computer program code comprising code for performing the method according to claim 13.

19. The apparatus according to claim 1, wherein the coverage carrier determines cell coverage of the cell, and the capacity carrier is a cell extension 20. The apparatus according to claim 8, wherein the coverage carrier determines cell coverage of the cell, and the capacity carrier is a cell extension 21. The method according to claim 11, wherein the coverage carrier determines cell coverage of the cell, and the capacity carrier is a cell extension.

22. The method according to claim 13, wherein the coverage carrier determines cell coverage of the cell, and the capacity carrier is a cell extension.

* * * * *

UNITED STATES PATENT AND TRADEMARK OFFICE
CERTIFICATE OF CORRECTION

PATENT NO. : 8,737,327 B2
APPLICATION NO. : 13/126873
DATED : May 27, 2014
INVENTOR(S) : Frederiksen et al.

Page 1 of 1

It is certified that error appears in the above-identified patent and that said Letters Patent is hereby corrected as shown below:

In the Claims:

Claim 1, Column 11, line 29, "configured to" should be deleted.

Signed and Sealed this
Twelfth Day of August, 2014

Michelle K. Lee
*Deputy Director of the United States Patent and Trademark Office*